United States Patent
Lyu et al.

(10) Patent No.: US 10,411,865 B2
(45) Date of Patent: Sep. 10, 2019

(54) METHOD FOR TRANSMITTING UPLINK CONTROL INFORMATION AND APPARATUS

(71) Applicant: Huawei Technologies Co., Ltd., Shenzhen (CN)

(72) Inventors: Yongxia Lyu, Beijing (CN); Zhiyu Yan, Shenzhen (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 38 days.

(21) Appl. No.: 15/896,560

(22) Filed: Feb. 14, 2018

(65) Prior Publication Data

US 2018/0191476 A1     Jul. 5, 2018

Related U.S. Application Data

(63) Continuation of application No. PCT/CN2015/087095, filed on Aug. 14, 2015.

(51) Int. Cl.
    *H04L 5/00*           (2006.01)
    *H04L 1/00*           (2006.01)
    (Continued)

(52) U.S. Cl.
    CPC ............... *H04L 5/0053* (2013.01); *H04L 1/00* (2013.01); *H04L 1/0026* (2013.01);
    (Continued)

(58) Field of Classification Search
    CPC ..... H04L 5/001; H04L 5/0053; H04L 5/0055; H04L 47/70; H04L 47/827; H04L 67/108;
    (Continued)

(56) References Cited

U.S. PATENT DOCUMENTS

| | | | |
|---|---|---|---|
| 9,497,742 B2* | 11/2016 | Gao | H04L 1/1671 |
| 2011/0243066 A1* | 10/2011 | Nayeb Nazar | H04L 1/007 370/328 |

(Continued)

FOREIGN PATENT DOCUMENTS

| | | |
|---|---|---|
| CN | 102377540 A | 3/2012 |
| CN | 103178926 A | 6/2013 |

(Continued)

OTHER PUBLICATIONS

3rd Generation Partnership Project; Technical Specification Group Radio Access Network; Evolved Universal Terrestrial Radio Access (E-UTRA); Physical layer procedures (Release 12), 3GPP TS 36.213 V12.6.0 (Jun. 2015), 241 pages.

(Continued)

*Primary Examiner* — Warner Wong
(74) *Attorney, Agent, or Firm* — Slater Matsil, LLP

(57) ABSTRACT

Embodiments of the present invention provide a method for transmitting uplink control information and an apparatus, applicable to a multi-carrier system. A user terminal receives physical layer signaling from a network device, where the physical layer signaling includes first indication information. The user terminal determines, according to the first indication information, a bit quantity of periodic CSI that can be sent on a channel resource or a piece quantity of periodic CSI that can be sent on a channel resource. The user terminal determines, according to the bit quantity or the piece quantity of the periodic CSI that can be sent, to-be-sent periodic CSI from periodic CSI corresponding to multiple downlink carriers. The user terminal sends HARQ-ACK information and the to-be-sent periodic CSI on the channel resource.

20 Claims, 2 Drawing Sheets

(51) Int. Cl.
  *H04L 1/18* (2006.01)
  *H04W 28/06* (2009.01)
  *H04W 72/04* (2009.01)
  *H04W 72/12* (2009.01)
  *H04W 72/02* (2009.01)
  *H04L 12/911* (2013.01)
  *H04W 28/04* (2009.01)

(52) U.S. Cl.
  CPC .............. *H04L 1/0072* (2013.01); *H04L 1/18* (2013.01); *H04L 1/1861* (2013.01); *H04W 28/06* (2013.01); *H04W 72/0453* (2013.01); *H04W 72/1284* (2013.01); *H04L 5/001* (2013.01); *H04L 47/827* (2013.01); *H04W 28/04* (2013.01); *H04W 72/02* (2013.01)

(58) Field of Classification Search
  CPC . H04W 28/04; H04W 28/06; H04W 72/0453; H04W 72/1284; H04W 72/00; H04W 72/02; H04W 72/04; H04W 72/0406; H04W 72/0413; H04W 72/042; H04W 72/048; H04W 28/00
  See application file for complete search history.

(56) References Cited

U.S. PATENT DOCUMENTS

| | | | |
|---|---|---|---|
| 2011/0269490 A1* | 11/2011 | Earnshaw | H04L 1/0026 455/509 |
| 2011/0310759 A1* | 12/2011 | Gerstenberger | H04L 5/001 370/252 |
| 2012/0039252 A1 | 2/2012 | Damnjanovic et al. | |
| 2012/0076028 A1* | 3/2012 | Ko | H04L 1/0026 370/252 |
| 2012/0082157 A1* | 4/2012 | Yamada | H04L 1/0073 370/389 |
| 2012/0087254 A1* | 4/2012 | Yin | H04L 1/0031 370/252 |
| 2012/0120817 A1* | 5/2012 | Khoshnevis | H04L 1/0026 370/252 |
| 2012/0127869 A1* | 5/2012 | Yin | H04L 1/0031 370/252 |
| 2013/0044653 A1* | 2/2013 | Yang | H04L 1/1671 370/280 |
| 2013/0083742 A1* | 4/2013 | Baldemair | H04L 1/003 370/329 |
| 2013/0100911 A1* | 4/2013 | Lv | H04L 1/0026 370/329 |
| 2013/0117622 A1* | 5/2013 | Blankenship | H03M 13/136 714/751 |
| 2013/0208665 A1* | 8/2013 | Baldemair | H04L 1/0031 370/329 |
| 2013/0215807 A1* | 8/2013 | Yang | H04L 1/0026 370/281 |
| 2014/0036704 A1* | 2/2014 | Han | H04W 28/12 370/252 |
| 2014/0071864 A1 | 3/2014 | Seo et al. | |
| 2014/0078974 A1* | 3/2014 | Falahati | H04L 5/0055 370/329 |
| 2014/0301324 A1 | 10/2014 | Cheng et al. | |
| 2014/0362792 A1* | 12/2014 | Cheng | H04L 1/0029 370/329 |
| 2015/0043452 A1* | 2/2015 | Li | H04L 1/0026 370/329 |
| 2015/0110029 A1* | 4/2015 | Hwang | H04L 1/0026 370/329 |
| 2015/0173066 A1 | 6/2015 | Gao et al. | |
| 2015/0223230 A1 | 8/2015 | Liang et al. | |
| 2015/0249982 A1 | 9/2015 | Falahati et al. | |
| 2016/0234829 A1* | 8/2016 | Takahashi | H04L 5/0057 |
| 2016/0294531 A1* | 10/2016 | Loehr | H04W 72/0413 |
| 2016/0366675 A1* | 12/2016 | Dinan | H04L 5/001 |
| 2016/0366681 A1* | 12/2016 | Dinan | H04L 5/00 |
| 2018/0160423 A1* | 6/2018 | Yan | H04L 5/0053 |
| 2018/0167935 A1* | 6/2018 | Yan | H04W 72/04 |
| 2018/0263031 A1* | 9/2018 | Cheng | H04L 1/0029 |

FOREIGN PATENT DOCUMENTS

| | | |
|---|---|---|
| CN | 103209483 A | 7/2013 |
| CN | 103581891 A | 2/2014 |
| EP | 2637347 A2 | 9/2013 |
| EP | 2882128 A1 | 6/2015 |
| JP | 2013542625 A | 11/2013 |
| JP | 2014511057 A | 5/2014 |
| JP | 2015523831 A | 8/2015 |
| WO | 2014019541 A1 | 2/2014 |
| WO | 2014022032 A1 | 2/2014 |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V12.6.0 (Jun. 2015), 449 pages.

* cited by examiner

METHOD FOR TRANSMITTING UPLINK CONTROL INFORMATION AND APPARATUS

CROSS-REFERENCE TO RELATED APPLICATIONS

This application is a continuation of International Application No. PCT/CN2015/087095, filed on Aug. 14, 2015, the disclosure of which is hereby incorporated by reference in its entirety.

TECHNICAL FIELD

This application relates to the wireless communications field, and in particular, to a method for transmitting uplink control information and an apparatus.

BACKGROUND

Wireless communications technologies have developed to a Long Term Evolution (LTE) system. To better improve a data rate of user equipment (UE), the LTE system can support a carrier aggregation (CA) technology. The CA technology mainly means configuring multiple carriers for one UE, to improve a data rate of the UE. A base station using the CA technology synchronously transmits data or a control signal on the multiple carriers. Correspondingly, the UE detects a physical downlink control channel (PDCCH) of each carrier and a corresponding physical downlink shared channel (PDSCH), and receives data on a downlink data channel or sends data on an uplink data channel.

The base station that supports the CA technology synchronously transmits data on the multiple carriers. Therefore, correspondingly, the UE that supports the CA technology may simultaneously detect downlink data on multiple downlink carriers. Because the LTE system uses a hybrid automatic repeat request (HARQ) mechanism, the UE needs to simultaneously provide a HARQ feedback for the downlink data on the multiple downlink carriers. With reference to a hybrid automatic repeat request-acknowledgment (HARQ-ACK) feedback requirement in the HARQ mechanism, the UE needs to feed back, on one channel, HARQ-ACK information of the downlink data on the multiple downlink carriers. The HARQ-ACK information may include acknowledgement (ACK) information and negative acknowledgement (NACK) information, and may further include DTX information.

In another aspect, in order that the base station can schedule the UE on the multiple downlink carriers and transmit downlink data, the UE needs to feed back channel state information (CSI) of each carrier to the base station. CSI reporting is classified into periodic CSI reporting and aperiodic CSI reporting. The periodic CSI reporting is usually implemented using a physical uplink control channel (PUCCH). The base station configures parameters of periodic CSI reporting for each downlink carrier using higher layer signaling. These parameters may include a reporting period, a reporting subframe offset, a used PUCCH resource, a reporting mode, and the like of periodic CSI. According to the reporting period, the reporting subframe offset, the used PUCCH resource, the reporting mode, and the like, of the periodic CSI that are configured for each carrier, the UE may determine a bit quantity and reported content of periodic CSI reporting performed in a reporting subframe for each carrier.

It can be learned that, for the multiple carriers, the UE may need to simultaneously feed back the HARQ-ACK information for the downlink data carried on these carriers and the periodic CSI of the carriers to the base station in one uplink subframe. The HARQ-ACK information and the periodic CSI may be collectively referred to as uplink control information (UCI).

The PUCCH has a relatively small capacity, and the HARQ-ACK information is more important than the periodic CSI. Therefore, when the HARQ-ACK information and the periodic CSI are transmitted simultaneously on a resource of the PUCCH, the UE needs to preferentially ensure performance of transmitting the HARQ-ACK information by the UE. In current carrier aggregation supporting five carriers, to ensure transmission performance of HARQ-ACK information, the UE can feed back periodic CSI of a maximum of one carrier in one uplink subframe. Apparently, the foregoing manner results in lack of periodic CSI of other carriers, and affects accuracy in scheduling the UE by the base station on the multiple carriers.

As the LTE technology further evolves, carrier aggregation of more carriers, for example, carrier aggregation of 32 carriers, may be introduced into the CA technology. In this case, if the UE can still feed back periodic CSI of a maximum of one carrier in one uplink subframe, accuracy in scheduling the UE by the base station on the multiple carriers is severely affected. Therefore, in this case, a higher-capacity PUCCH format needs to be introduced to send UCI information. Therefore, the UE needs to simultaneously transmit HARQ-ACK information and periodic CSI of the multiple carriers in one uplink subframe on a resource of the higher-capacity PUCCH format.

As described above, the HARQ-ACK information is more important than the periodic CSI. Therefore, when the HARQ-ACK information and multiple pieces of periodic CSI are transmitted simultaneously on the resource of the PUCCH, transmission performance of the HARQ-ACK information needs to be ensured. In this case, currently, there is still no specific implementation solution to ensure the transmission performance of the HARQ-ACK information and to send as much periodic CSI as possible.

SUMMARY

Embodiments of the present invention provide a method for transmitting uplink control information and an apparatus, so that transmission performance of HARQ-ACK information can be ensured, and as much periodic CSI as possible can be sent.

According to one aspect, an embodiment of the present invention provides a method for sending uplink control information. A user terminal sends HARQ-ACK information and periodic CSI using a channel resource. A carrier corresponding to the HARQ-ACK information and the periodic CSI belongs to multiple downlink carriers. The method includes receiving, by the user terminal by using at least one of the multiple downlink carriers, downlink data transmitted by a network device. The method also includes receiving, by the user terminal, physical layer signaling from the network device. The physical layer signaling includes first indication information, and the first indication information includes one or any combination of the following: bit quantity information of the periodic CSI, piece quantity information of the periodic CSI, encoding bit rate information of the HARQ-ACK information, information about a quantity of resources that need to be occupied by the HARQ-ACK information, maximum bit quantity information of UCI information that can be transmitted on the channel resource, or an identifier of the channel resource. The method also includes determining, by the user terminal according to the first indication information, a bit quantity of periodic CSI that can be sent on the channel resource or a piece quantity of periodic CSI that can be sent on the channel resource. The method also includes determining, by the user terminal according to the bit quantity or the piece quantity of the periodic CSI that can be sent, to-be-sent periodic CSI from periodic CSI corresponding to the multiple downlink carriers. The method also includes sending, by the user terminal, the HARQ-ACK information and the to-be-sent periodic CSI on the channel resource.

Optionally, there are at least two channel resources that can be used by the user terminal to send the HARQ-ACK information and the periodic CSI. The channel resource used by the user terminal to send the HARQ-ACK information and the periodic CSI is selected for the user terminal by the network device from the at least two channel resources. The first indication information includes the identifier of the channel resource. The determining, by the user terminal according to the first indication information, a bit quantity of periodic CSI that can be sent on the channel resource includes: determining, by the user terminal according to the identifier and a specified correspondence between a channel resource identifier and second indication information, second indication information corresponding to the identifier, where the second indication information includes one or any combination of the following: the bit quantity information of the periodic CSI, the piece quantity information of the periodic CSI, the encoding bit rate information of the HARQ-ACK information, the information about the quantity of resources that need to be occupied by the HARQ-ACK information, or the maximum bit quantity information of the UCI information that can be transmitted on the channel resource; and determining, by the user terminal according to the second indication information, the bit quantity of the periodic CSI that can be sent on the channel resource.

Optionally, the correspondence includes a correspondence between an identifier of each channel resource and second indication information of the corresponding channel resource, or includes a correspondence between the identifier of the channel resource and the second indication information. The channel resources that can be used to send the HARQ-ACK information and the periodic CSI include two or more channel resources of different formats and/or two or more channel resources of a same format, where the channel resources of the same format correspond to different second indication information.

According to another aspect, an embodiment of the present invention provides a user terminal. The user terminal sends HARQ-ACK information and periodic CSI using a channel resource. A carrier corresponding to the HARQ-ACK information and the periodic CSI belongs to multiple downlink carriers. The user terminal includes a receiving unit, configured to receive, using at least one of the multiple downlink carriers, downlink data transmitted by a network device, and receive physical layer signaling from the network device. First indication information included in the physical layer signaling includes one or any combination of the following: bit quantity information of the periodic CSI, piece quantity information of the periodic CSI, encoding bit rate information of the HARQ-ACK information, information about a quantity of resources that need to be occupied by the HARQ-ACK information, maximum bit quantity information of UCI information that can be transmitted on the channel resource, or an identifier of the channel resource. The user terminal also includes a processing unit, configured to determine, according to the first indication information received by the receiving unit, a bit quantity or a piece quantity of periodic CSI that can be sent on the channel resource; and determine, according to the bit quantity or the piece quantity of the periodic CSI that can be sent on the channel resource, to-be-sent periodic CSI from periodic CSI corresponding to the multiple downlink carriers. The user terminal also includes a sending unit, configured to send, on the channel resource, the HARQ-ACK information and the to-be-sent periodic CSI that is determined by the processing unit.

Optionally, there are at least two channel resources that can be used by the user terminal to send the HARQ-ACK information and the periodic CSI. The channel resource used by the user terminal to send the HARQ-ACK information and the periodic CSI is selected for the user terminal by the network device from the at least two channel resources. The first indication information includes the identifier of the channel resource. The processing unit being configured to determine, according to the first indication information, a bit quantity of periodic CSI that can be sent on the channel resource includes the processor being configured to: determine, according to the identifier and a specified correspondence between a channel resource identifier and second indication information, second indication information corresponding to the identifier, where the second indication information includes one or any combination of the following: the bit quantity information of the periodic CSI, the piece quantity information of the periodic CSI, the encoding bit rate information of the HARQ-ACK information, the information about the quantity of resources that need to be occupied by the HARQ-ACK information, or the maximum bit quantity information of the UCI information that can be transmitted on the channel resource; and determine, according to the second indication information, the bit quantity of the periodic CSI that can be sent on the channel resource. Optionally, the correspondence includes a correspondence between an identifier of each channel resource and second indication information of the corresponding channel resource, or includes a correspondence between the identifier of the channel resource and the second indication information. The channel resources that can be used to send the HARQ-ACK information and the periodic CSI include two or more channel resources of different formats and/or two or more channel resources of a same format, where the channel resources of the same format correspond to different second indication information.

According to still another aspect, an embodiment of the present invention provides a method for receiving uplink control information. A user terminal sends HARQ-ACK information and periodic CSI by using a channel resource. A carrier corresponding to the HARQ-ACK information and the periodic CSI belongs to multiple downlink carriers. The method includes transmitting, by a network device, downlink data to the user terminal using at least one of the multiple downlink carriers. The method also includes determining, by the network device, indication information, and sending the indication information to the user terminal using physical layer signaling. The indication information includes one or any combination of the following: bit quantity information of the periodic CSI, piece quantity information of the periodic CSI, encoding bit rate information of the HARQ-ACK information, information about a quantity of resources that need to be occupied by the HARQ-ACK information, maximum bit quantity information of UCI information that can be transmitted on the channel resource, or an identifier of the channel resource. The method also includes receiving, by the network device on the channel resource, the periodic CSI and the HARQ-ACK information that are reported by the user terminal.

According to yet another aspect, an embodiment of the present invention provides a network device, applicable to a wireless communications system that includes a user terminal. The user terminal sends HARQ-ACK information and periodic CSI using a channel resource. A carrier corresponding to the HARQ-ACK information and the periodic CSI belongs to multiple downlink carriers. The network device includes a sending unit, configured to: transmit downlink data to the user terminal by using at least one of the multiple downlink carriers, and send physical layer signaling to the user terminal, where the physical layer signaling includes indication information determined by a processing unit. The network device also includes the processing unit, configured to determine the indication information. The indication information includes one or any combination of the following: bit quantity information of the periodic CSI, piece quantity information of the periodic CSI, encoding bit rate information of the HARQ-ACK information, information about a quantity of resources that need to be occupied by the HARQ-ACK information, maximum bit quantity information of UCI information that can be transmitted on the channel resource, or an identifier of the channel resource. The network device also includes a receiving unit, configured to receive the periodic CSI and the HARQ-ACK information that are reported by the user terminal.

According to the embodiments of the present invention, before sending the HARQ-ACK information and the periodic CSI, the user terminal receives the first indication information by using the physical layer signaling, and thereby can obtain indication information that is dynamically determined for the user terminal by the network device. The user terminal determines, according to the first indication information, the bit quantity or the piece quantity of the periodic CSI that can be sent on the channel resource, and thereby can determine CSI that can be sent in periodic CSI that needs to be fed back in a current subframe for a carrier of the multiple downlink carriers. In this way, when the HARQ-ACK information and the periodic CSI of the multiple downlink carriers are sent simultaneously, on the premise that transmission performance of the HARQ-ACK information is ensured, and as much periodic CSI as possible can be sent, so that a problem that accuracy in scheduling the user terminal by a base station is affected because the user terminal cannot report the periodic CSI of all the downlink carriers is avoided to the greatest extent possible.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
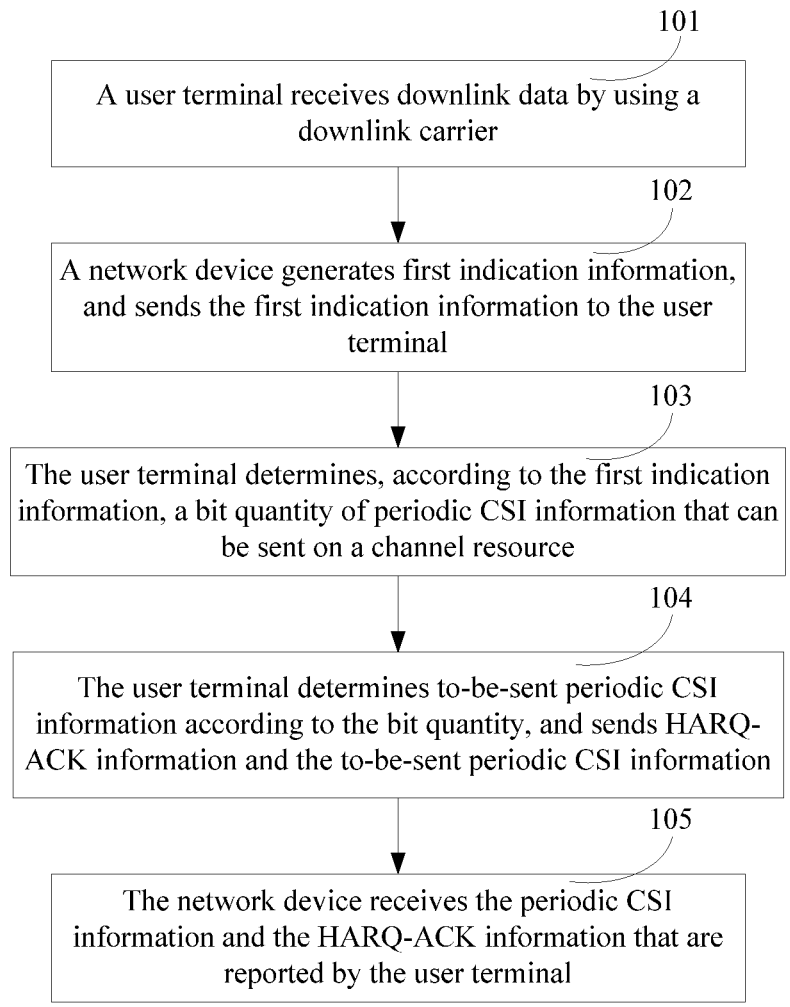
FIG. 1 is a flowchart of a method according to an embodiment of the present invention.

Although an LTE system is used as an example for description in the BACKGROUND section, a person skilled in the art shall understand that the present invention is not only applicable to the LTE system, but also applicable to another wireless communications system, for example, a GSM system, a UMTS system, a CDMA system, or a new network system. The following describes specific embodiments by using the LTE system as an example.

In the embodiments of the present invention, a user terminal may be user equipment, or may be a similar device such as a handheld terminal. A network device may be a base station such as an eNodeB, or may be a similar network device. This is not limited in the embodiments of the present invention. The user terminal and the network device may be included in the foregoing various wireless communications systems.

In a current system, a quantity of resources that need to be occupied by HARQ-ACK information is constant, and a quantity of PUCCH channel resources is also constant. Therefore, a user terminal may determine, according to the quantity of PUCCH channel resources and the quantity of resources that need to be occupied by the HARQ-ACK information, whether a quantity of remaining resources is sufficient for feeding back periodic CSI, to determine whether the HARQ-ACK information and the periodic CSI can be fed back simultaneously. If the quantity of remaining resources is insufficient for feeding back the periodic CSI, the periodic CSI is not fed back.

For example, when there is a relatively small quantity of carriers in carrier aggregation, for example, when there are no more than five carriers, a quantity of resources occupied by the HARQ-ACK information in a PUCCH may be set to a constant resource quantity. The constant resource quantity is greater than a resource quantity that is required in the PUCCH under the worst channel condition when transmission performance of the HARQ-ACK just meets a requirement. When there is a relatively small quantity of carriers, a resource quantity varies little under the best channel condition and under the worst channel condition. Therefore, the constant resource quantity of the PUCCH may be used to send the HARQ-ACK, to meet requirements for transmission performance of the HARQ-ACK under various channel conditions, without wasting many resources. Moreover, because there is a relatively small quantity of carriers, periodic CSI of only one carrier or even no periodic CSI can be sent on the PUCCH. Downlink data scheduling is little affected in both cases.

When the PUCCH can support sending HARQ-ACK of more downlink carrier data and CSI of more downlink carriers, downlink data scheduling is greatly affected if to-be-sent periodic CSI is dropped. To drop less to-be-sent periodic CSI, fewest resources possible in the resources of the PUCCH should be used to send the HARQ-ACK information. Therefore, it is usually not the case like the current system in which the constant resource quantity is used in the PUCCH to transmit the HARQ-ACK information, to meet the requirements for the transmission performance of the HARQ-ACK under the various channel conditions, without consideration of a resource waste caused by configuration of the constant resource quantity. For example, when a channel condition changes, or the like, to ensure that transmission performance of the HARQ-ACK information meets a requirement, a quantity of resources that need to be occupied by the HARQ-ACK information is usually inconstant, and may vary greatly. Therefore, according to the solution in the current system, there is no way for UE to ensure the transmission performance of the HARQ-ACK information and send as much periodic CSI as possible.

In view of this, in solutions of the embodiments of the present invention, when the UE simultaneously transmits the HARQ-ACK information and the periodic CSI, the transmission performance of the HARQ-ACK information needs to be ensured, and as much periodic CSI as possible needs to be sent.

When the conditions of the PUCCH support sending the HARQ-ACK of more downlink carrier data and the CSI of more downlink carriers, the UE may encode the HARQ-ACK information using convolutional coding or the like, and a base station may adjust an encoding bit rate of the HARQ-ACK information. As such, the HARQ-ACK information reported by the UE can adapt to a change of the channel condition. Further, transmission performance of the HARQ-ACK information is ensured. In view of this case, the embodiments of the present invention provide the following solutions, so that as much periodic CSI as possible can be sent on the premise that the transmission performance of the HARQ-ACK information is ensured.

The following describes various possible implementations in specific embodiments with reference to the accompanying drawings.

In an embodiment of the present invention, mainly, a network device sends first indication information to a user terminal, and the user terminal determines, according to the first indication information, a bit quantity of periodic CSI that can be transmitted. In this manner, transmission performance of HARQ-ACK information can be ensured, and as much periodic CSI as possible can be sent. In this embodiment, a channel resource is allocated to the user terminal, and the user terminal sends the HARQ-ACK information and the periodic CSI using the channel resource. A carrier corresponding to the HARQ-ACK information and the periodic CSI belongs to multiple downlink carriers.

As shown in FIG. 1, this embodiment includes the following steps.

Step 101: The user terminal receives, using at least one of multiple downlink carriers, downlink data transmitted by the network device.

Step 102: The network device determines first indication information for the user terminal, and sends the first indication information to the user terminal using physical layer signaling.

The first indication information is mainly used by the user terminal to determine a bit quantity of periodic CSI that can be sent on a channel resource. The channel resource generally includes a PUCCH. The first indication information may include one or any combination of the following: bit quantity information of the periodic CSI, piece quantity information of the periodic CSI, encoding bit rate information of HARQ-ACK information, information about a quantity of resources that need to be occupied by the HARQ-ACK information, maximum bit quantity information of UCI information that can be transmitted on the channel resource, or an identifier of the channel resource.

The bit quantity information of the periodic CSI may represent the bit quantity of the periodic CSI that can be sent on the channel resource. The representation may be an explicit representation or may be a representation using a correspondence. For example, identifiers may be set to correspond to different bit quantities. "Represent" mentioned below is similar, and is not illustrated.

The piece quantity information of the periodic CSI may represent a piece quantity of the periodic CSI that can be sent on the channel resource. One piece of periodic CSI corresponds to periodic CSI of one carrier or periodic CSI of one process.

The encoding bit rate information of the HARQ-ACK information may represent an encoding bit rate of the HARQ-ACK information.

The information about the quantity of resources that need to be occupied by the HARQ-ACK information may represent the quantity of resources that need to be occupied by the HARQ-ACK information.

The maximum bit quantity information of the UCI information that can be transmitted on the channel resource may represent a maximum bit quantity of the UCI information that can be transmitted on the channel resource.

The first indication information is determined for the user terminal. In other words, the first indication information is indication information specific to the user terminal.

The first indication information may be sent to the user terminal using a physical downlink control channel (PDCCH) or an enhanced physical downlink control channel (EPDCCH).

Step 103: The user terminal determines, according to the first indication information, a bit quantity or a piece quantity of periodic CSI that can be sent on a channel resource.

The bit quantity of the periodic CSI that can be sent on the channel resource is a bit quantity of periodic CSI that can be sent on the premise that the channel resource meets transmission of the HARQ-ACK information. The bit quantity is usually less than or equal to a bit quantity of periodic CSI that needs to be fed back for the multiple downlink carriers. The bit quantity of the periodic CSI that needs to be fed back may be a bit quantity of periodic CSI that needs to be fed back in a current subframe for an active-state carrier in the multiple downlink carriers.

The piece quantity of the periodic CSI that can be sent on the channel resource may be a piece quantity of the periodic CSI that can be sent on the premise that the channel resource meets the requirement for the transmission of the HARQ-ACK information. The piece quantity is usually less than or equal to a piece quantity of the periodic CSI that needs to be fed back for the multiple downlink carriers. The piece quantity of the periodic CSI that needs to be fed back may be a piece quantity of the periodic CSI that needs to be fed back in the current subframe for the active-state carrier in the multiple downlink carriers. One piece of periodic CSI corresponds to periodic CSI of one carrier or periodic CSI of one process.

The network device may send, to the user terminal using the physical layer signaling, the first indication information that is dynamically determined for the user terminal, so that the user terminal can learn the bit quantity of the periodic CSI that can be currently sent on the channel resource. It can be learned that because the first indication information is dynamically determined for the user terminal by the network device. The first indication information may be different or may be the same under different circumstances. Correspondingly, bit quantities determined by the user terminal according to the first indication information may usually be different, but may be the same in some cases.

The bit quantity or the piece quantity that is determined in step 103 and that is of the periodic CSI that can be sent on the channel resource may be understood as a bit quantity or a piece quantity of periodic CSI capable of being sent on the channel resource.

Moreover, in this embodiment of the present invention, the network device sends the first indication information to the user terminal in step 102. Alternatively, the user terminal may obtain the first indication information in another manner. For example, the user terminal stores the first indication information.

Step 104: The user terminal determines, according to the bit quantity or the piece quantity of the periodic CSI that can be sent on the channel resource, to-be-sent periodic CSI from periodic CSI corresponding to the multiple downlink carriers, and sends HARQ-ACK information and the to-be-sent periodic CSI on the channel resource.

Before sending the HARQ-ACK information and the periodic CSI, the user terminal may encode the information according to an encoding bit rate, and then send encoded information. Correspondingly, the user terminal needs to determine an encoding bit rate of the periodic CSI and the encoding bit rate of the HARQ-ACK information.

The HARQ-ACK information that needs to be transmitted by the user terminal may be HARQ-ACK information directly corresponding to the multiple downlink carriers, or may be HARQ-ACK information corresponding to a carrier on which data is transmitted in the multiple downlink carriers, or may be HARQ-ACK information of some downlink carriers configured for the user terminal.

The user terminal may send scheduling request (SR) information in addition to the periodic CSI and the HARQ-ACK information. In this case, when the periodic CSI and the HARQ-ACK information corresponding to the multiple downlink carriers are sent, a quantity of bits that need to be occupied by the SR information further needs to be considered. The quantity of bits that need to be occupied by the SR information is usually constant, for example, 1 bit.

In addition, in the foregoing embodiment, the user terminal sends periodic CSI corresponding to at least one carrier, but actually, it is possible that no periodic CSI needs to be currently fed back. In this case, the user terminal does not feed back periodic CSI.

In addition, if the HARQ-ACK information needs to occupy a relatively large quantity of resources, but a quantity of resources currently available for transmitting the UCI information is limited, the bit quantity that is determined in step 103 and that is of the periodic CSI may alternatively be only 1 bit, or even only o bits.

Step 105: The network device receives, on the channel resource, the periodic CSI and the HARQ-ACK information that are reported by the user terminal.

In an embodiment, the network device may further demodulate the received HARQ-ACK information and periodic CSI according to the encoding bit rate of the HARQ-ACK information and the encoding bit rate of the periodic CSI.

If the encoding bit rate of the HARQ-ACK information is the same as the encoding bit rate of the periodic CSI, the network device demodulates the received HARQ-ACK and periodic CSI according to the encoding bit rate of the HARQ-ACK information and the encoding bit rate of the periodic CSI. If the encoding bit rate of the HARQ-ACK information is different from the encoding bit rate of the periodic CSI, the network device demodulates the received HARQ-ACK and periodic CSI according to the encoding bit rate of the HARQ-ACK information and the encoding bit rate of the periodic CSI, respectively.

By means of the foregoing processing, before sending the HARQ-ACK information and the periodic CSI, the user terminal receives the physical layer signaling, and determines, according to the first indication information in the physical layer signaling, the bit quantity of the periodic CSI that can be sent on the channel resource. The user terminal thereby can determine a bit quantity of CSI that can be sent in periodic CSI that needs to be fed back in the current subframe for a carrier of the multiple downlink carriers. The carrier of the multiple downlink carriers may be an active-state carrier. In this way, when the HARQ-ACK information and the periodic CSI of the multiple downlink carriers are sent simultaneously, on the premise that transmission performance of the HARQ-ACK information is ensured, as much periodic CSI as possible can be sent, so that a problem that accuracy in scheduling the user terminal by a base station is affected because the user terminal cannot report the periodic CSI of all the downlink carriers is avoided to the greatest extent possible.

The following describes some specific implementation solutions of the foregoing embodiment in detail.

In step 102, the first indication information may be any one or any combination of multiple types of information. The following describes some cases using examples.

In a first case, the first indication information in step 102 may include the bit quantity information of the periodic CSI.

In step 103, the user terminal may directly determine, according to a bit quantity corresponding to the bit quantity information of the periodic CSI, the bit quantity of the periodic CSI that can be sent on the channel resource.

If the piece quantity of the periodic CSI that can be sent on the channel resource is to be determined, the user terminal needs to obtain, according to the bit quantity of the periodic CSI and a configured bit quantity and a configured priority of each piece of CSI sent by the UE in the current subframe, the piece quantity of the periodic CSI that can be sent on the channel.

For example, if the user equipment determines that the bit quantity of the periodic CSI that can be sent on the channel resource is K, and it is configured that a prioritized sequence of the CSI sent by the UE in the current subframe is CSI-1, CSI-2, . . . , and CSI-N, and that bit quantities of the information CSI-1, CSI-2, . . . , and CSI-N are $k_1, k_2, \ldots,$ and $k_N$ in sequence, the user equipment determines that the piece quantity of the periodic CSI that can be sent on the channel resource is L, where L≤N, and $$\sum_{i=1}^{L} k_i \leq K.$$

For this manner, in step 102, the network device needs to determine the bit quantity corresponding to the bit quantity information. It may be understood that if the bit quantity information is not the bit quantity, before the bit quantity information is determined, the bit quantity needs to be first determined. The following cases in which the network device determines the first indication information are also similar to this manner.

The encoding bit rate of the HARQ-ACK information and the encoding bit rate of the periodic CSI may be the same or may be different. Therefore, the following separately describes the two cases.

If the encoding bit rate of the HARQ-ACK information is the same as the encoding bit rate of the periodic CSI, the bit quantity of the periodic CSI that can be sent on the channel resource needs to meet the following: A sum of the bit quantity of the periodic CSI that can be sent on the channel resource and an original bit quantity of the HARQ-ACK information is less than or equal to the maximum bit quantity of the UCI information that can be transmitted on the channel resource. Because the encoding bit rate of the HARQ-ACK information is the same as the encoding bit rate of the periodic CSI, the maximum bit quantity of the UCI information that can be transmitted on the channel resource corresponds to a total quantity of the channel resource, the encoding bit rate of the HARQ-ACK information, and the encoding bit rate of the periodic CSI.

For this case, during specific implementation, the network device may first determine the encoding bit rate of the HARQ-ACK information and the encoding bit rate of the periodic CSI according to a target received bit error rate of the HARQ-ACK information and a channel condition. The channel condition may be information such as a signal to interference plus noise ratio. Then, the network device may determine, according to the total resource quantity of the channel resource and the encoding bit rates, the maximum bit quantity of the UCI information that can be transmitted on the channel resource. Then, the network device may subtract the original bit quantity of the HARQ-ACK information from the maximum bit quantity, to obtain the bit quantity of the periodic CSI that can be sent on the channel resource.

If the encoding bit rate of the HARQ-ACK information is different from the encoding bit rate of the periodic CSI, the bit quantity of the periodic CSI that can be sent on the channel resource corresponds to a quantity of resources that can be occupied by the periodic CSI and the encoding bit rate of the periodic CSI. If the encoding bit rate of the HARQ-ACK information is different from the encoding bit rate of the periodic CSI, the quantity of resources that can be occupied by the periodic CSI is less than or equal to a difference between a total quantity of the channel resource and a quantity of resources occupied by the HARQ-ACK information. The quantity of resources occupied by the HARQ-ACK information corresponds to the encoding bit rate of the HARQ-ACK information and an original bit quantity of the HARQ-ACK information.

For this case, during specific implementation, the network device may determine the encoding bit rate of the HARQ-ACK information using the foregoing method. The network device may further determine, according to the original bit quantity of the HARQ-ACK information, the quantity of resources occupied by the HARQ-ACK information. The network device may then subtract the quantity of resources occupied by the HARQ-ACK information from the total resource quantity of the channel resource, to obtain the quantity of resources that can be occupied by the periodic CSI. The network device may then determine the encoding bit rate of the periodic CSI according to a preset difference between the encoding bit rate of the HARQ-ACK and the encoding bit rate of the periodic CSI, where the preset difference may be preconfigured, or may be notified to the user terminal by the network device. The network device may then finally obtain, according to the encoding bit rate of the periodic CSI and the quantity of resources that can be occupied by the periodic CSI, the bit quantity of the periodic CSI that can be sent on the channel resource.

The target received bit error rate is a bit error rate obtained by the network device by demodulating the HARQ-ACK information after the HARQ-ACK information is sent to the network device, and the encoding bit rate is determined according to the target received bit error rate and the channel condition. Therefore, when allocation of the resource quantity in the channel resource is determined using the encoding bit rate, the transmission performance of the HARQ-ACK information can be ensured.

In step 103, the user terminal may further determine the encoding bit rate of the periodic CSI and the encoding bit rate of the HARQ-ACK information according to the bit quantity corresponding to the bit quantity information of the periodic CSI. There are also two cases according to whether the encoding bit rates are the same or different.

If the encoding bit rate of the HARQ-ACK information is the same as the encoding bit rate of the periodic CSI, the determined encoding bit rate of the HARQ-ACK information should correspond to the maximum bit quantity of the UCI information that can be transmitted on the channel resource and the total resource quantity of the channel resource, and the maximum bit quantity of the UCI information that can be transmitted on the channel resource is greater than or equal to a sum of the original bit quantity of the HARQ-ACK information and the bit quantity of the periodic CSI that can be sent on the channel resource.

For this case, during specific implementation, the user terminal may determine, according to the original bit quantity of the HARQ-ACK information and the bit quantity of the periodic CSI that can be sent on the channel resource, the maximum bit quantity of the UCI information that can be transmitted on the channel resource. The user terminal may then determine the encoding bit rate of the HARQ-ACK information and the encoding bit rate of the periodic CSI according to the maximum bit quantity and the total resource quantity of the channel resource.

If the encoding bit rate of the HARQ-ACK information is different from the encoding bit rate of the periodic CSI, the encoding bit rate of the periodic CSI and the encoding bit rate of the HARQ-ACK information need to meet the following formulas:

$$P_{ACK}*N_{ACK}+(P_{ACK}+\Delta)*N_{CSI}=Q \quad \text{(Formula 1), and}$$

$$P_{CSI}=P_{ACK}\Delta \quad \text{(Formula 2), where}$$

$P_{ACK}$ is the encoding bit rate of the HARQ-ACK information, $P_{CSI}$ is the encoding bit rate of the periodic CSI, $N_{ACK}$ is the original bit quantity of the HARQ-ACK information, $N_{CSI}$ is the bit quantity of the periodic CSI that can be sent on the channel resource, Q is the total resource quantity of the channel resource, and A is the difference between the encoding bit rate of the HARQ-ACK information and the encoding bit rate of the periodic CSI.

For this case, during specific implementation, the user terminal may determine the encoding bit rate $P_{ACK}$ of the HARQ-ACK information using the foregoing formula 1 and according to the original bit quantity $N_{ACK}$ of the HARQ-ACK information, the bit quantity $N_{CSI}$ of the periodic CSI that can be sent on the channel resource, the preset difference Δ between the encoding bit rate of the HARQ-ACK information and the encoding bit rate of the periodic CSI, and the total resource quantity Q of the channel resource. The user terminal may further determine the encoding bit rate of the periodic CSI by using the foregoing formula 2 and according to the encoding bit rate $P_{ACK}$ of the HARQ-ACK information and the difference Δ.

In a second case, the first indication information in step 102 may include the piece quantity information of the periodic CSI.

For this case, in step 102, the network device may determine the piece quantity of the periodic CSI according to the bit quantity of the periodic CSI on the basis of the foregoing first case.

For example, the network device may obtain, according to the bit quantity of the periodic CSI and a configured bit quantity and a configured priority of each piece of CSI sent by the UE in the current subframe, the piece quantity of the periodic CSI that can be sent on the channel. For example, if the network device determines that the bit quantity of the periodic CSI that can be sent is K, and it is configured that a prioritized sequence of the CSI sent by the UE in the current subframe is CSI-1, CSI-2, ..., and CSI-N, and that bit quantities of the information CSI-1, CSI-2, ..., and CSI-N are $k_1, k_2, \ldots,$ and $k_N$ in sequence, the network-side device determines that the piece quantity of the periodic CSI that can be sent on the channel resource is L, where L≤N, and $$\sum_{i=1}^{L} k_i \le K.$$

Correspondingly, in step 103, the user terminal needs to determine the bit quantity of the periodic CSI according to the piece quantity information.

The user terminal may determine, according to the piece quantity of the CSI that can be sent on the channel resource and the bit quantity and the priority of each piece of CSI sent by the user terminal in the current subframe, the bit quantity of the periodic CSI that can be sent by the user terminal on the channel resource. For example, if the piece quantity that is determined by the user terminal and that is of the periodic CSI that can be sent is L, the prioritized sequence of the CSI sent by the user terminal in the current subframe is CSI-1, CSI-2, ..., and CSI-N, and the bit quantities of the information CSI-1, CSI-2, ..., and CSI-N are $k_1, k_2, \ldots,$ and $k_N$ in sequence, the user terminal determines that the bit quantity of the periodic CSI that can be sent on the channel resource is L, where $$L = \sum_{i=1}^{L} k_i.$$

If the user terminal further needs to determine the encoding bit rate of the periodic CSI and the encoding bit rate of the HARQ-ACK information, for a specific determining method, refer to the method in the foregoing first case. Details are not described herein again.

In a third case, the first indication information in step 102 may include the encoding bit rate information of the HARQ-ACK information.

For this manner, in step 102, the network device needs to first determine an encoding bit rate corresponding to the encoding bit rate information. The encoding bit rate of the HARQ-ACK information corresponds to a target received bit error rate of the HARQ-ACK information and a channel condition. During specific implementation, as described in the first case, the network device may determine the encoding bit rate of the HARQ-ACK information according to the target received bit error rate of the HARQ-ACK information and the channel condition.

The network device usually further needs to determine the encoding bit rate of the periodic CSI. If the two encoding bit rates are the same, the encoding bit rate of the HARQ-ACK information is directly used as the encoding bit rate of the periodic CSI. If the encoding bit rates are different, the network device may determine the encoding bit rate of the periodic CSI according to the encoding bit rate of the HARQ-ACK information and a preset difference between the encoding bit rate of the HARQ-ACK information and the encoding bit rate of the periodic CSI.

Correspondingly, in step 103, the user terminal needs to determine, according to the encoding bit rate corresponding to the encoding bit rate information of the HARQ-ACK information, the bit quantity or the piece quantity of the periodic CSI that can be sent on the channel resource.

A solution to determining the bit quantity is first described. According to whether the encoding bit rate of the HARQ-ACK information is the same as or different from the encoding bit rate of the periodic CSI, there are two cases in which the user terminal determines the bit quantity of the periodic CSI that can be sent on the channel resource.

If the encoding bit rate of the HARQ-ACK information is the same as the encoding bit rate of the periodic CSI, the bit quantity of the periodic CSI that can be sent on the channel resource is less than or equal to a difference between the maximum bit quantity of the UCI information that can be transmitted on the channel resource and an original bit quantity of the HARQ-ACK information, and the maximum bit quantity of the UCI information that can be transmitted on the channel resource corresponds to the encoding bit rate of the HARQ-ACK information and a total resource quantity of the channel resource.

For this case, during specific implementation, the user terminal may determine, according to the encoding bit rates and the total resource quantity of the channel resource, the maximum bit quantity of the UCI information that can be transmitted on the channel resource; and then obtain, according to the original bit quantity of the HARQ-ACK information, the bit quantity of the periodic CSI that can be sent on the channel resource. The encoding bit rate of the HARQ-ACK information and the encoding bit rate of the periodic CSI can be directly determined.

If the encoding bit rate of the HARQ-ACK information is different from the encoding bit rate of the periodic CSI, the bit quantity of the periodic CSI that can be sent on the channel resource corresponds to the encoding bit rate of the periodic CSI and a quantity of resources that can be occupied by the periodic CSI, the encoding bit rate of the periodic CSI is equal to a sum of the encoding bit rate of the HARQ-ACK information and the difference between the encoding bit rate of the HARQ-ACK information and the encoding bit rate of the periodic CSI, the quantity of resources that can be occupied by the periodic CSI is less than or equal to a difference between a total resource quantity of the channel resource and a quantity of resources occupied by the HARQ-ACK information, and the quantity of resources occupied by the HARQ-ACK information corresponds to the encoding bit rate of the HARQ-ACK information and an original bit quantity of the HARQ-ACK information.

For this case, during specific implementation, the user terminal may obtain, according to the encoding bit rates and the original bit quantity of the HARQ-ACK information, the quantity of resources occupied by the HARQ-ACK information. The user terminal may then subtract the quantity of resources occupied by the HARQ-ACK information from the total resource quantity of the channel resource, to obtain the quantity of resources that can be occupied by the periodic CSI. The user terminal may then determine the encoding bit rate of the periodic CSI according to the preset difference between the encoding bit rate of the HARQ-ACK and the encoding bit rate of the periodic CSI, where the preset difference may be preconfigured, or may be notified to the user terminal by the network device. The user terminal may finally obtain, according to the encoding bit rate of the periodic CSI and the quantity of resources that can be occupied by the periodic CSI, the bit quantity of the periodic CSI that can be sent on the channel resource.

It can be learned that, using the foregoing process, the user equipment can already determine the encoding bit rate of the HARQ-ACK information and the encoding bit rate of the periodic CSI. Therefore, no separate processing is required to determine the encoding bit rates. After the foregoing bit quantity of the periodic CSI is determined, the user terminal may determine the piece quantity of the periodic CSI according to the bit quantity of the periodic CSI. For specific implementation, refer to descriptions in the foregoing cases, and details are not described herein again.

In a fourth case, the first indication information in step 102 may include the information about the quantity of resources that need to be occupied by the HARQ-ACK information.

For this manner, in step 102, the network device needs to determine a resource quantity corresponding to the information about the quantity of resources that need to be occupied by the HARQ-ACK information. The quantity of resources that need to be occupied by the HARQ-ACK information is greater than or equal to a resource quantity obtained according to an original bit quantity of the HARQ-ACK information and the encoding bit rate of the HARQ-ACK information, and the encoding bit rate of the HARQ-ACK information corresponds to a target received bit error rate of the HARQ-ACK information and a channel condition.

During specific implementation, the network device may determine the encoding bit rate of the HARQ-ACK information according to the target received bit error rate of the HARQ-ACK information and the channel condition. The network device may then determine, according to the original bit quantity of the HARQ-ACK information and the determined encoding bit rate of the HARQ-ACK information, the quantity of resources that need to be occupied by the HARQ-ACK information. Similar to the second case, the network device may further determine the encoding bit rate of the periodic CSI. Details are not described herein again.

Correspondingly, in step 103, the user terminal needs to determine, according to the resource quantity corresponding to the information about the quantity of resources that need to be occupied by the HARQ-ACK information, the bit quantity or the piece quantity of the periodic CSI that can be sent on the channel resource. There are also two cases according to whether the encoding bit rates are the same or different.

If the encoding bit rate of the HARQ-ACK information is the same as the encoding bit rate of the periodic CSI, the bit quantity of the periodic CSI that can be sent on the channel resource needs to be less than or equal to a difference between the maximum bit quantity of the UCI information that can be transmitted on the channel resource and the original bit quantity of the HARQ-ACK information, the maximum bit quantity of the UCI information that can be transmitted on the channel resource corresponds to the encoding bit rate of the HARQ-ACK information and a total resource quantity of the channel resource, and the encoding bit rate of the HARQ-ACK information corresponds to the quantity of resources that need to be occupied by the HARQ-ACK information and the original bit quantity of the HARQ-ACK information.

For this case, during specific implementation, the user terminal may determine the encoding bit rate of the HARQ-ACK information according to the quantity of resources that need to be occupied by the HARQ-ACK information and the original bit quantity of the HARQ-ACK information. The user terminal may then determine, according to the encoding bit rate of the HARQ-ACK information and the total resource quantity of the channel resource, the maximum bit quantity of the UCI information that can be transmitted on the channel resource. The user terminal may then obtain, according to the original bit quantity of the HARQ-ACK information and the maximum bit quantity, the bit quantity of the periodic CSI that can be sent on the channel resource.

If the encoding bit rate of the HARQ-ACK information is different from the encoding bit rate of the periodic CSI, the bit quantity of the periodic CSI that can be sent on the channel resource should correspond to a quantity of resources that can be occupied by the periodic CSI and the encoding bit rate of the CSI, and the quantity of resources that can be occupied by the periodic CSI is less than or equal to a difference between a total resource quantity of the channel resource and the quantity of resources that need to be occupied by the HARQ-ACK information.

For this case, during specific implementation, the user terminal may determine the encoding bit rate of the HARQ-ACK information according to the quantity of resources that need to be occupied by the HARQ-ACK information and the original bit quantity of the HARQ-ACK information. The user terminal may determine the encoding bit rate of the periodic CSI according to a preset difference between the encoding bit rate of the HARQ-ACK information and the encoding bit rate of the periodic CSI. The user terminal may determine, according to the quantity of resources that need to be occupied by the HARQ-ACK information and the total resource quantity of the channel resource, the quantity of resources that can be occupied by the periodic CSI. The user terminal may then obtain, according to the quantity of resources that can be occupied by the periodic CSI and the encoding bit rate of the periodic CSI, the bit quantity of the periodic CSI that can be sent on the channel resource.

In the foregoing two cases, the user terminal can determine the encoding bit rate of the HARQ-ACK information and the encoding bit rate of the periodic CSI by using the foregoing process.

Similar to the third case, after the foregoing bit quantity of the periodic CSI is determined, the user terminal may determine the piece quantity of the periodic CSI according to the bit quantity of the periodic CSI. For specific implementation, refer to descriptions in the foregoing cases, and details are not described herein again.

In a fifth case, the first indication information in step 102 may include the maximum bit quantity information of the UCI information that can be transmitted on the channel resource.

For this manner, in step 102, the network device needs to determine the maximum bit quantity corresponding to the maximum bit quantity information.

If the encoding bit rate of the HARQ-ACK information is the same as the encoding bit rate of the periodic CSI, the maximum bit quantity of the UCI information that can be transmitted on the channel resource is equal to a bit quantity obtained according to a total resource quantity of the channel resource and the encoding bit rate of the HARQ-ACK information. The encoding bit rate of the HARQ-ACK information corresponds to a target received bit error rate of the HARQ-ACK information and a channel condition.

For this case, during specific implementation, the network device may determine the encoding bit rate of the HARQ-ACK information and the encoding bit rate of the periodic CSI according to the target received bit error rate of the HARQ-ACK information and the channel condition. The network device may then determine, according to the encoding bit rates and the total resource quantity of the channel resource, the maximum bit quantity of the UCI information that can be transmitted on the channel resource.

If the encoding bit rate of the HARQ-ACK information is different from the encoding bit rate of the periodic CSI, the maximum bit quantity of the UCI information that can be transmitted on the channel resource is greater than or equal to a sum of a bit quantity of the HARQ-ACK information and the bit quantity of the periodic CSI that can be sent on the channel resource, the bit quantity of the periodic CSI that can be sent on the channel resource corresponds to the encoding bit rate of the periodic CSI and a quantity of resources that can be occupied by the periodic CSI, there is a difference between the encoding bit rate of the periodic CSI and the encoding bit rate of the HARQ-ACK information, the quantity of resources that can be occupied by the periodic CSI is a resource quantity obtained by subtracting a quantity of resources occupied by the HARQ-ACK information from a total resource quantity of the channel resource, the quantity of resources occupied by the HARQ-ACK information corresponds to the encoding bit rate of the HARQ-ACK information and the bit quantity of the HARQ-ACK information, and the encoding bit rate of the HARQ-ACK information corresponds to a target received bit error rate of the HARQ-ACK information and a channel condition.

For this case, during specific implementation, the network device may first determine the encoding bit rate of the HARQ-ACK information, where a specific manner is the same as that described above, and details are not described herein again. The network device may further determine the quantity of resources occupied by the HARQ-ACK information. The network device may then subtract the quantity of resources occupied by the HARQ-ACK information from the total resource quantity of the channel resource, to obtain the quantity of resources that can be occupied by the periodic CSI. The network device may then determine the encoding bit rate of the periodic CSI according to the preset difference between the encoding bit rate of the HARQ-ACK information and the encoding bit rate of the periodic CSI. The network device may then finally obtain, according to the encoding bit rate of the periodic CSI and the quantity of resources that can be occupied by the periodic CSI, the bit quantity of the periodic CSI that can be sent on the channel resource. The network device may ultimately obtain, according to the bit quantity of the HARQ-ACK information and the determined bit quantity of the periodic CSI that can be sent, the maximum bit quantity of the UCI information that can be transmitted on the channel resource.

Correspondingly, in step 103, the user terminal needs to determine, according to the maximum bit quantity corresponding to the maximum bit quantity information, the bit quantity or the piece quantity of the periodic CSI that can be sent on the channel resource. The bit quantity of the periodic CSI that can be sent on the channel resource can be obtained by subtracting an original bit quantity of the HARQ-ACK information from the maximum bit quantity, and the bit quantity of the periodic CSI that can be sent on the channel resource may be less than or equal to a difference between the maximum bit quantity and the original bit quantity of the HARQ-ACK information.

Similar to the foregoing cases, after the foregoing bit quantity of the periodic CSI is determined, the user terminal may determine the piece quantity of the periodic CSI according to the bit quantity of the periodic CSI. For specific implementation, refer to descriptions in the foregoing cases, and details are not described herein again.

In step 103, the user terminal may further determine the encoding bit rate of the periodic CSI and the encoding bit rate of the HARQ-ACK information according to the maximum bit quantity corresponding to the maximum bit quantity information. There are also two cases according to whether the encoding bit rates are the same or different.

If the encoding bit rate of the HARQ-ACK information is the same as the encoding bit rate of the periodic CSI, the user terminal may determine the encoding bit rate of the periodic CSI and the encoding bit rate of the HARQ-ACK information according to the maximum bit quantity and the total resource quantity of the channel resource.

If the encoding bit rate of the HARQ-ACK information is different from the encoding bit rate of the periodic CSI, the user terminal may determine the respective encoding bit rates of the HARQ-ACK information and the periodic CSI according to the original bit quantity of the HARQ-ACK information, the bit quantity of the periodic CSI that can be sent on the channel resource, the preset difference between the encoding bit rate of the HARQ-ACK and the encoding bit rate of the periodic CSI, and the total resource quantity of the channel resource. For details, refer to descriptions in the first case, and details are not described herein again.

In a sixth case, the first indication information in step 102 may include the identifier of the channel resource. Generally, there may be multiple channel resources that can be used by the user terminal to report UCI information. Therefore, the network device may allocate one of the channel resources to the user terminal. Formats of the multiple channel resources may be the same or may be different. Channel capacities of channel resources of a same format may be the same or may be different. In this case, different second indication information usually needs to be configured for the channel resources. The network device may select a channel resource according to an original bit quantity of HARQ-ACK. For example, if the original bit quantity of the HARQ-ACK is relatively large, a channel resource with a relatively large total resource quantity is selected. Certainly, selection may be performed in another manner according to a case such as information that currently needs to be transmitted.

Correspondingly, in step 103, the user terminal may specifically determine the second indication information according to the identifier and a specified correspondence. The correspondence may include a correspondence between the identifier and the second indication information. Alternatively, the correspondence may include an identifier of each channel resource and second indication information of the corresponding channel resource. The second indication information may include one or any combination of the following: the bit quantity information of the periodic CSI, the piece quantity information of the periodic CSI, the encoding bit rate information of the HARQ-ACK information, the information about the quantity of resources that need to be occupied by the HARQ-ACK information, or the maximum bit quantity information of the UCI information that can be transmitted on the channel resource.

For example, there are four channel resources that can be used to send the UCI information, the second indication information includes all the foregoing information, and the correspondence includes the identifier of each channel resource and the second indication information of the corresponding channel resource. The correspondence in this case may be shown in Table 1. An identifier 00 corresponds to a first channel resource, an identifier 01 corresponds to a second channel resource, an identifier 10 corresponds to a third channel resource, and an identifier 11 corresponds to a fourth channel resource.

TABLE 1

| Identifier | Second indication information | | | |
|---|---|---|---|---|
| 00 | Bit quantity information $N_{a1}$ of periodic CSI informationCSI | Encoding bit rate information $N_{a2}$ of HARQ-ACK information | Information $N_{a3}$ about a quantity of resources that need to be occupied by the HARQ-ACK information | Maximum bit quantity information $N_{a4}$ of UCI information that can be transmitted on a channel resource 1 |
| 01 | Bit quantity information $N_{b1}$ of periodic CSI informationCSI | Encoding bit rate information $N_{b2}$ of HARQ-ACK information | Information $N_{b3}$ about a quantity of resources that need to be occupied by the HARQ-ACK information | Maximum bit quantity information $N_{b4}$ of UCI information that can be transmitted on a channel resource 2 |
| 10 | Bit quantity information $N_{c1}$ of periodic CSI informationCSI | Encoding bit rate information $N_{c2}$ of HARQ-ACK information | Information $N_{c3}$ about a quantity of resources that need to be occupied by the HARQ-ACK information | Maximum bit quantity information $N_{c4}$ of UCI information that can be transmitted on a channel resource 3 |
| 11 | Bit quantity information $N_{d1}$ of periodic CSI informationCSI | Encoding bit rate information $N_{d2}$ of HARQ-ACK information | Information $N_{d3}$ about a quantity of resources that need to be occupied by the HARQ-ACK information | Maximum bit quantity information $N_{d4}$ of UCI information that can be transmitted on a channel resource 4 |

The user terminal then determines, according to the second indication information, the bit quantity of the periodic CSI that can be sent on the channel resource. The user terminal may further determine the encoding bit rate of the HARQ-ACK information and the encoding bit rate of the periodic CSI. For specific implementation, refer to the foregoing descriptions, and details are not described herein again.

Specific processing in the five cases is described above. A person skilled in the art may readily figure out, by using the foregoing five cases, specific implementation corresponding to any combination of the foregoing cases. Therefore, various combinations are not described in detail one by one.

The foregoing sixth case relates to multiple channel resources. Multiple channel resources may also exist in the other cases. Therefore, the network device also needs to select a channel resource. Formats of the channel resources may include one of the following formats. Certainly, this embodiment of the present invention is not limited to the following formats.

First format: a physical uplink control channel (PUCCH) format 3. Symbols, obtained after channel coding and modulation are performed on original bits, are separately placed in two timeslots of one subframe. In this way, there are 12 modulation symbols in each timeslot, and the 12 modulation symbols are placed on 12 consecutive subcarriers of one time-domain symbol of the timeslot, that is, occupy 12 subcarriers of one time-domain symbol in one resource block (RB). Then, spread spectrum is performed for each timeslot in a time domain using an orthogonal cover code (OCC) of a length 5 and by using a sequence w. One timeslot occupies five time-domain symbols in one RB, different UEs may perform code division multiplexing in one RB by using different OCCs, and two other symbols are used to carry a reference signal (RS). Then, discrete Fourier transform (DFT) precoding and inverse fast Fourier transform (IFFT) are performed after the spread spectrum.

Second format: a first format based on the PUCCH format 3. A channel resource of the PUCCH format 3 is spread, to occupy N (N>1) RBs. Two RBs are used as an example, and each timeslot that occupies 12 subcarriers is spread, so that each timeslot occupies 24 subcarriers. Bits that are obtained after channel coding and scrambling are performed on original bits are modulated, and then separately placed on each subcarrier of two RBs in one subframe. Then, spread spectrum is performed for each timeslot in a time domain using an orthogonal cover code (OCC) of a length 5 and by using a sequence w. One timeslot occupies five time-domain symbols, and two other symbols are used to carry a reference signal (RS). A mapping location of a demodulation reference signal is the same as that in the PUCCH format 3. Then, on each symbol, unified length-24 DFT precoding and inverse fast Fourier transform (IFFT) are performed on data that is in the two RBs and that is obtained after the spread spectrum. A solution to spreading into three or more RBs is similar, and spreading needs to be performed only in a frequency domain. In addition to RM coding, original bit information of this format may be encoded by using a convolutional code, for example, a tail biting convolutional code (TBCC).

Third format: a second format based on the PUCCH format 3. A channel resource occupies N (N>1) RBs, and a format of each RB is the same as that in the foregoing PUCCH format 3. Two RBs are used as an example, and each timeslot that occupies 12 subcarriers is spread, so that each timeslot occupies 24 subcarriers. Bits that are obtained after channel coding and scrambling are performed on original bits are modulated, and then separately placed on each subcarrier of two RBs in one subframe. Then, spread spectrum is performed for each timeslot in a time domain by using an orthogonal cover code (OCC) of a length 5 and using a sequence w. One timeslot occupies five time-domain symbols, and two other symbols are used to carry a reference signal (RS). A mapping location of a demodulation reference signal is the same as that in the PUCCH format 3. Then, on each symbol, length-12 DFT precoding is performed on data that is in each of the two RBs and that is obtained after the spread spectrum. Each DFT precoding result is mapped to a frequency domain for inverse fast Fourier transform, to complete IFFT transform on a carrier. A solution to spreading into three or more RBs is similar, and spreading needs to be performed only in a frequency domain. In addition to RM coding, original bit information of this format may be encoded using a convolutional code, for example, a tail biting convolutional code (TBCC).

Fourth format: a third format based on the PUCCH format 3. A channel resource occupies N (N≥1) RBs. A possible manner is using a DFT-S-OFDM transmission mode on the channel resource. Symbols, obtained after channel coding and modulation are performed on original bits, are separately placed on K symbols of one subframe. Spread spectrum is performed on each of the K symbols in a time domain by using an orthogonal cover code OCC of a length M (M<5), each to-be-sent modulation symbol occupies M time-domain symbols, and there are also two symbols in each timeslot that are used to carry a reference signal (RS). A mapping location of a demodulation reference signal is the same as that in the PUCCH format 3. DFT precoding and inverse fast Fourier transform (IFFT) are performed after the spread spectrum. Another possible manner is using a DFT-S-OFDM transmission mode on each RB resource of N RBs. Symbols, obtained after channel coding and modulation are performed on original bits, are separately placed on K symbols of one subframe Spread spectrum is performed on each of the K symbols in a time domain by using an orthogonal cover code OCC of a length M (M<5), each to-be-sent modulation symbol occupies M time-domain symbols, and there are also two symbols in each timeslot that are used to carry a reference signal (RS). A mapping location of a demodulation reference signal is the same as that in the PUCCH format 3. In addition to RM coding, original bit information of this format may be encoded by using a convolutional code, for example, a tail biting convolutional code (TBCC).

Fifth format: a fourth format based on the PUCCH format 3. A channel resource occupies N (N≥1) RBs. A possible manner is using a DFT-S-OFDM transmission mode on the channel resource. Symbols, obtained after channel coding and modulation, are separately placed in two timeslots of one subframe. P (P≥2) encoded modulation symbols may be placed on each symbol. In a time domain, spread spectrum is performed on the P encoded modulation symbols on each symbol using P different orthogonal cover codes OCCs of a length 5, and P signals obtained after the spread spectrum are superposed. Each to-be-sent modulation symbol occupies five time-domain symbols, and there are also two symbols in each timeslot that are used to carry a reference signal (RS). A mapping location of a demodulation reference signal is the same as that in the PUCCH format 3. Then, DFT precoding and inverse fast Fourier transform (IFFT) are performed after the spread spectrum. Another possible manner is using a DFT-S-OFDM transmission mode on each RB resource of N RBs. Original bits are separately placed in two timeslots of one subframe after channel coding and modulation. P (P≥2) encoded modulation symbols may be placed on each symbol. In a time domain, spread spectrum is performed on the P encoded modulation symbols on each symbol using P different orthogonal cover codes OCCs of a length 5, and P signals obtained after the spread spectrum are superposed. Each to-be-sent modulation symbol occupies five time-domain symbols, and there are also two symbols in each timeslot that are used to carry a reference signal (RS). A mapping location of a demodulation reference signal is the same as that in the PUCCH format 3. In addition to RM coding, original bit information of this format may be encoded using a convolutional code, for example, a tail biting convolutional code (TBCC).

Sixth format: a format based on a PUSCH. A channel resource occupies N (N≥1) RBs. In a normal CP case, a symbol in the middle of each PRB is a demodulation reference signal; and in an extended CP case, a third symbol of each PRB is a demodulation reference signal. Original information that is to be fed back is mapped to locations other than a location of the demodulation reference signal on a first PUCCH channel resource after channel coding and modulation. Then, DFT precoding and inverse fast Fourier transform (IFFT) are performed. Original bit information of this format may be encoded by using a convolutional code, for example, a tail biting convolutional code (TBCC).

In addition, in step 102, when the HARQ-ACK information and the periodic CSI are separately encoded and modulated, the first indication information sent by the network device may further include a modulation scheme of the periodic CSI.

In an embodiment, when a same determined modulation scheme, for example, QPSK, is used for the HARQ-ACK information and the periodic CSI, there is a one-to-one correspondence between respective encoded bit quantities of the HACK-ACK and the periodic CSI and respective quantities of channel resources occupied by the HACK-ACK and the periodic CSI. If the encoding bit rate of the periodic CSI is different from the encoding bit rate of the HARQ-ACK, multiple modulation schemes such as 16QAM and 64QAM that are different from a modulation scheme of the HARQ-ACK may be used for the periodic CSI. In this case, after determining the encoding bit rate of the periodic CSI, the network device may determine a modulation scheme of the periodic CSI according to the target received bit error rate of the CSI, the channel condition, and the encoding bit rate of the periodic CSI. The network device may then send information about the determined modulation scheme of the periodic CSI to the UE by using the first indication information.

Correspondingly, in this embodiment of the present invention, before sending the periodic CSI in step 104, the UE may further obtain the information about the modulation scheme of the periodic CSI using the first indication information; determine, according to the modulation scheme, the quantity of resources that can be occupied by the periodic CSI, and the encoding bit rate of the periodic CSI, the bit quantity of the periodic CSI that can be sent. The UE may modulate the encoded to-be-sent periodic CSI using the modulation scheme. The UE may then send, on the channel resource, the periodic CSI corresponding to the at least one of the multiple downlink carriers.

The foregoing describes some specific implementations of steps 102 and 103. The following describes some specific implementations of steps 104 and 105.

In step 104, the user terminal needs to determine the to-be-sent periodic CSI. The bit quantity or the piece quantity that is determined in step 103 and that is of the periodic CSI that can be sent on the channel resource is usually less than a bit quantity or a piece quantity of periodic CSI that currently needs to be sent. Therefore, the user terminal needs to select periodic CSI, to determine the to-be-sent periodic CSI.

A specific selection rule may be as follows. When there is a carrier group of carriers, a priority of a carrier group with a smaller carrier group number is higher than that of a carrier group with a larger carrier group number. When all periodic CSI corresponding to the carrier group with a smaller carrier group number can be transmitted, if there are still remaining resources, periodic CSI corresponding to the carrier group with a larger carrier group number is then transmitted. When there are two carrier groups, a carrier in one carrier group is a carrier for which no corresponding HARQ-ACK information currently needs to be sent, and a carrier in the other group has corresponding HARQ-ACK information that needs to be sent.

For a same carrier group, a priority of a carrier with a smaller carrier sequence number is higher than that of a carrier with a larger carrier sequence number.

The user terminal may further determine, according to a priority of the periodic CSI, periodic CSI to be preferentially sent, for example, determine that periodic CSI that has a high priority in the periodic CSI needing to be sent and that can meet the bit quantity or the piece quantity of the periodic CSI that can be sent is the to-be-sent periodic CSI. The priority is determined according to a type of the periodic CSI or a carrier sequence number corresponding to the periodic CSI. Alternatively, a priority of each piece of CSI is first determined according to a type of the periodic CSI, and then priorities of CSI of a same type are determined according to priorities of carrier sequence numbers corresponding to the CSI. A priority of periodic CSI corresponding to a smaller carrier sequence number is higher than a priority of CSI periodic CSI corresponding to a larger carrier sequence number. A rule for determining a priority according to the type of the periodic CSI is as follows. A priority of periodic CSI including an RI is the highest.

The rule for determining a priority according to the type of the periodic CSI is as follows: including a rank indication RI > including at least one of a wideband CQI or a wideband PMI > including at least one of a subband CQI or a subband PMI.

In this manner, periodic CSI of a more important carrier may be preferentially sent, so that not only the problem that accuracy in scheduling the user terminal by the base station is affected because the user terminal cannot report the periodic CSI of all the downlink carriers is avoided to the greatest extent possible, but accuracy in scheduling an important carrier of the user terminal by the base station can also be ensured to the greatest extent possible.

The foregoing embodiment describes the implementation method. The following describes the user terminal and the network device corresponding to the implementation method.

Figure 2:
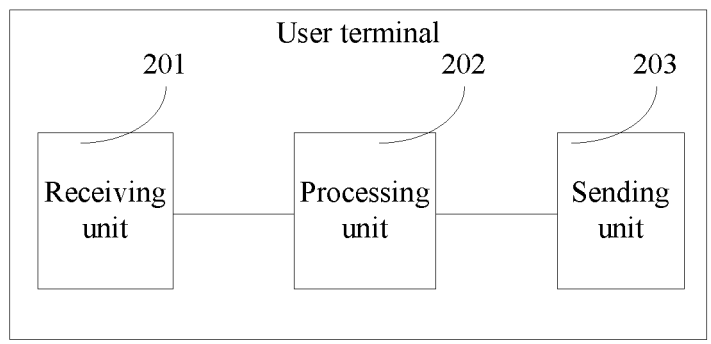
FIG. 2 is a schematic structural diagram of a user terminal according to an embodiment of the present invention.

A user terminal in an embodiment of the present invention is shown in FIG. 2. The user terminal sends HARQ-ACK information and periodic CSI using a channel resource. A carrier corresponding to the HARQ-ACK information and the periodic CSI belongs to multiple downlink carriers. The user terminal may include a receiving unit 201, a processing unit 202, and a sending unit 203.

The receiving unit 201 is configured to: receive, using at least one of the multiple downlink carriers, downlink data transmitted by a network device, and receive physical layer signaling from the network device. The network-side signaling includes first indication information. The first indication information is the same as that described in the foregoing method embodiment, and is not described in detail herein again.

The processing unit 202 is configured to determine, according to the first indication information received by the receiving unit, a bit quantity or a piece quantity of periodic CSI that can be sent on the channel resource. The processing unit 202 is further configured to determine, according to the bit quantity or the piece quantity of the periodic CSI that can be sent on the channel resource, to-be-sent periodic CSI from periodic CSI corresponding to the multiple downlink carriers.

The sending unit 203 is configured to send, on the channel resource, the HARQ-ACK information and the to-be-sent periodic CSI that is determined by the processing unit.

The first indication information may include an identifier of the channel resource. In this case, as described in the foregoing method embodiment, the processing unit in the user terminal may determine, according to the identifier and a specified correspondence, second indication information corresponding to the identifier; and then determine, according to the second indication information, the bit quantity of the periodic CSI that can be sent on the channel resource. For specific descriptions of the correspondence and the second indication information, refer to descriptions in the foregoing method embodiment. Details are not described herein again.

The first indication information or the second indication information may include different information. For the different information, the processing unit in the user terminal may perform different processing.

For example, if the first indication information or the second indication information includes bit quantity information of the periodic CSI, the processing unit may determine, according to the bit quantity, the bit quantity of the periodic CSI that can be sent on the channel resource.

If the first indication information or the second indication information includes piece quantity information of the periodic CSI, the processing unit may determine, according to the piece quantity, the bit quantity of the periodic CSI that can be sent on the channel resource.

The processing unit may be further configured to determine, according to encoding bit rate information of the HARQ-ACK information, information about a quantity of resources that need to be occupied by the HARQ-ACK information, maximum bit quantity information of UCI information that can be transmitted on the channel resource, or the like, the bit quantity or the piece quantity of the periodic CSI that can be sent on the channel resource.

The processing unit may further determine an encoding bit rate of the HARQ-ACK information and an encoding bit rate of the periodic CSI according to the first indication information or the second indication information.

When the HARQ-ACK information and the periodic CSI are separately encoded and modulated, the first indication information further includes a modulation scheme of the periodic CSI. Correspondingly, before the to-be-sent periodic CSI is sent on the channel resource, the processing unit may be further configured to modulate the to-be-sent periodic CSI according to the modulation scheme.

For a specific processing method of the processing unit, refer to descriptions in various processing in the foregoing method embodiment. Details are not described herein again.

Figure 3:
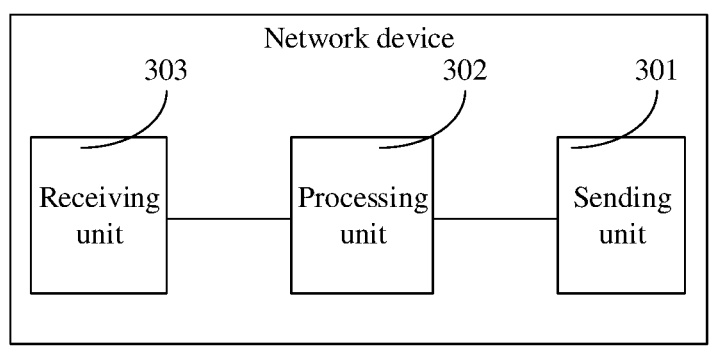
FIG. 3 is a schematic structural diagram of a network device according to an embodiment of the present invention.

A network device in an embodiment of the present invention is applicable to a wireless communications system that includes a user terminal. The user terminal sends HARQ-ACK information and periodic CSI using a channel resource. A carrier corresponding to the HARQ-ACK information and the periodic CSI belongs to multiple downlink carriers. As shown in FIG. 3, the network device may include a sending unit 301, configured to transmit downlink data to the user terminal using at least one of the multiple downlink carriers, and send physical layer signaling to the user terminal, where the physical layer signaling includes indication information determined by a processing unit. The network device may also include the processing unit 302, configured to determine the indication information, where the indication information includes one or any combination of the following: bit quantity information of the periodic CSI, piece quantity information of the periodic CSI, encoding bit rate information of the HARQ-ACK information, information about a quantity of resources that need to be occupied by the HARQ-ACK information, maximum bit quantity information of UCI information that can be transmitted on the channel resource, or an identifier of the channel resource; and a receiving unit 303, configured to receive the periodic CSI and the HARQ-ACK information that are reported by the user terminal.

Content of the indication information determined by the processing unit is the same as that of the first indication information in the foregoing method embodiment.

The processing unit determining the indication information may include the processing unit determining at least one type of information in the indication information. For a specific determining manner, refer to descriptions in the foregoing method embodiment. Details are not described herein again.

The processing unit may further determine an encoding bit rate of the HARQ-ACK information according to a target received bit error rate of the HARQ-ACK information and a channel condition. For specific implementation, refer to descriptions in the foregoing method embodiment.

Functional units in the embodiments of the present invention may be integrated into one processing unit, or each of the units may exist alone physically, or two or more units may be integrated into one unit. The integrated unit may be implemented in a form of hardware, or may be implemented in a form of a software functional unit. In addition, in the embodiments of the present invention, a processing unit may be a processor, a sending unit may be a transmitter, and a receiving unit may be a receiver.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces, indirect couplings or communication connections between the apparatuses or units, or electrical connections, mechanical connections, or connections in other forms.

What is claimed is:

1. A method, comprising:

receiving, by a user terminal using a first carrier of a plurality of downlink carriers, downlink data transmitted by a network device, wherein the user terminal sends Hybrid Automatic-Repeat-Request acknowledgement (HARQ-ACK) information and periodic channel state information (CSI) using a first channel resource, and one of the plurality of downlink carriers corresponds to the HARQ-ACK information and the periodic CSI;

receiving, by the user terminal, physical layer signaling from the network device, wherein the physical layer signaling comprises first indication information, and the first indication information comprises one or a combination of: bit quantity information of the periodic CSI, piece quantity information of the periodic CSI, encoding bit rate information of the HARQ-ACK information, information about a quantity of resources that need to be occupied by the HARQ-ACK information, maximum bit quantity of uplink control information (UCI) information that can be transmitted on the first channel resource, or an identifier of the first channel resource;

determining, by the user terminal according to the first indication information, a bit quantity of periodic CSI that can be sent on the first channel resource or a piece quantity of periodic CSI that can be sent on the first channel resource;

determining, by the user terminal according to the bit quantity of periodic CSI that can be sent on the first channel resource or the piece quantity of periodic CSI that can be sent on the first channel resource, to-be-sent periodic CSI from periodic CSI corresponding to the plurality of downlink carriers; and sending, by the user terminal, the HARQ-ACK information and the to-be-sent periodic CSI using the first channel resource.

2. The method according to claim 1, wherein a plurality of channel resources can be used by the user terminal to send the HARQ-ACK information and the periodic CSI, the plurality of channel resources including the first channel resource;

wherein the first channel resource used by the user terminal to send the HARQ-ACK information and the periodic CSI is selected for the user terminal by the network device from the plurality of channel resources;

wherein the first indication information comprises the identifier of the first channel resource; and wherein determining, by the user terminal according to the first indication information, a bit quantity of periodic CSI that can be sent on the first channel resource comprises:

determining, by the user terminal according to the identifier of the first channel resource and a correspondence between a channel resource identifier and second indication information, second indication information corresponding to the identifier of the first channel resource, wherein the second indication information comprises one or a combination of: the bit quantity information of the periodic CSI, the piece quantity information of the periodic CSI, the encoding bit rate information of the HARQ-ACK information, the information about the quantity of resources that need to be occupied by the HARQ-ACK information, or the maximum bit quantity information of the UCI information that can be transmitted on the first channel resource; and determining, by the user terminal according to the second indication information, the bit quantity of the periodic CSI that can be sent on the first channel resource.

3. The method according to claim 2, wherein the correspondence comprises a correspondence between an identifier of each channel resource of the plurality of channel resources and second indication information of the corresponding channel resource, or comprises a correspondence between the identifier of the first channel resource and the second indication information; and wherein the plurality of channel resources that can be used to send the HARQ-ACK information and the periodic CSI comprise two or more channel resources of different formats or two or more channel resources of a same format, wherein the two or more channel resources of the same format correspond to different second indication information.

4. The method according to claim 1, wherein determining, by the user terminal according to the first indication information, the piece quantity of periodic CSI that can be sent on the first channel resource, comprises:

determining, by the user terminal according to the bit quantity information of the periodic CSI and a bit quantity and a priority of each piece of periodic CSI sent by the user terminal in a current subframe, the piece quantity of the periodic CSI that can be sent on the first channel resource.

5. The method according to claim 1, wherein determining, by the user terminal according to the first indication information, the bit quantity of periodic CSI that can be sent on the first channel resource comprises:

determining, by the user terminal according to the piece quantity information of the periodic CSI and a bit quantity and a priority of each piece of CSI sent by the user terminal in a current subframe, the bit quantity of the periodic CSI that can be sent by the user terminal on the first channel resource.

6. The method according to claim 1, wherein, when an encoding bit rate of the HARQ-ACK information is the same as an encoding bit rate of the periodic CSI, determining, by the user terminal according to the first indication information, the bit quantity of periodic CSI that can be sent on the first channel resource or the piece quantity of periodic CSI that can be sent on the first channel resource, comprises:

determining, by the user terminal according to the encoding bit rate information of the HARQ-ACK information, the bit quantity of the periodic CSI that can be sent on the first channel resource, or determining, by the user terminal according to the encoding bit rate information of the HARQ-ACK information, the bit quantity of the periodic CSI that can be sent on the first channel resource, and determining the piece quantity of the periodic CSI according to the bit quantity of the periodic CSI that can be sent on the first channel resource and a configured bit quantity and a configured priority of each piece of periodic CSI sent by the user terminal in a current subframe, wherein the bit quantity of the periodic CSI that can be sent on the first channel resource is less than or equal to a difference between a maximum bit quantity of the UCI that can be transmitted on the first channel resource and an original bit quantity of the HARQ-ACK information, and the maximum bit quantity of the UCI information that can be transmitted on the first channel resource corresponds to the encoding bit rate of the HARQ-ACK information and a total resource quantity of the first channel resource; or wherein, when the encoding bit rate of the HARQ-ACK information is different from the encoding bit rate of the periodic CSI, determining, by the user terminal according to the encoding bit rate information of the HARQ-ACK information, the bit quantity of periodic CSI that can be sent on the first channel resource or the piece quantity of periodic CSI that can be sent on the first channel resource comprises:

determining, by the user terminal according to the encoding bit rate information of the HARQ-ACK information, the bit quantity of the periodic CSI that can be sent on the first channel resource; or determining, by the user terminal according to the encoding bit rate information of the HARQ-ACK information, the bit quantity of the periodic CSI that can be sent on the first channel resource, and determining the piece quantity of the periodic CSI according to the bit quantity and a configured bit quantity and a configured priority of each piece of periodic CSI sent by the user terminal in a current subframe, wherein the bit quantity of the periodic CSI that can be sent on the first channel resource corresponds to the encoding bit rate of the periodic CSI and a quantity of resources that can be occupied by the periodic CSI, the encoding bit rate of the periodic CSI is equal to a sum of the encoding bit rate of the HARQ-ACK information and a difference between the encoding bit rate of the HARQ-ACK information and the encoding bit rate of the periodic CSI, the quantity of resources that can be occupied by the periodic CSI is less than or equal to a difference between a total resource quantity of the first channel resource and the quantity of resources occupied by the HARQ-ACK information, and the quantity of resources occupied by the HARQ-ACK information corresponds to the encoding bit rate of the HARQ-ACK information and an original bit quantity of the HARQ-ACK information.

7. A user terminal, comprising:

a receiver, configured to:

receive, using a first carrier of a plurality of downlink carriers, downlink data transmitted by a network device, wherein the user terminal is configured to send Hybrid Automatic-Repeat-Request acknowledgement (HARQ-ACK) information and periodic channel state information (CSI) using a first channel resource, and one of the plurality of downlink carriers corresponds to the HARQ-ACK information and the periodic CSI; and receive physical layer signaling from the network device, wherein first indication information comprised in the physical layer signaling comprises one or a combination of: bit quantity information of the periodic CSI, piece quantity information of the periodic CSI, encoding bit rate information of the HARQ-ACK information, information about a quantity of resources that need to be occupied by the HARQ-ACK information, maximum bit quantity information of uplink control information (UCI) that can be transmitted on the first channel resource, or an identifier of the first channel resource;

a processor, configured to:
  determine, according to the first indication information received by the receiver, a bit quantity or a piece quantity of periodic CSI that can be sent on the first channel resource; and
  determine, according to the bit quantity of the periodic CSI that can be sent on the first channel resource or the piece quantity of the periodic CSI that can be sent on the first channel resource, to-be-sent periodic CSI from periodic CSI corresponding to the plurality of downlink carriers; and
a transmitter, configured to send, on the first channel resource, the HARQ-ACK information and the to-be-sent periodic CSI that is determined by the processor.

8. The user terminal according to claim 7, wherein a plurality of channel resources can be used by the user terminal to send the HARQ-ACK information and the periodic CSI, the plurality of channel resources including the first channel resource;
  wherein the first channel resource used by the user terminal to send the HARQ-ACK information and the periodic CSI is selected for the user terminal by the network device from the plurality of channel resources;
  wherein the first indication information comprises the identifier of the first channel resource; and
  wherein the processor being configured to determine, according to the first indication information, the bit quantity of periodic CSI that can be sent on the first channel resource comprises the processor being configured to:
    determine, according to the identifier of the first channel resource and a correspondence between a channel resource identifier and second indication information, the second indication information corresponding to the identifier of the first channel resource, wherein the second indication information comprises one or a combination of: the bit quantity information of the periodic CSI, the piece quantity information of the periodic CSI, the encoding bit rate information of the HARQ-ACK information, the information about the quantity of resources that need to be occupied by the HARQ-ACK information, or the maximum bit quantity information of the UCI information that can be transmitted on the channel resource; and
  determine, according to the second indication information, the bit quantity of the periodic CSI that can be sent on the first channel resource.

9. The user terminal according to claim 8, wherein the correspondence comprises a correspondence between an identifier of each channel resource of the plurality of channel resources and second indication information of the corresponding channel resource, or comprises a correspondence between the identifier of the first channel resource and the second indication information; and
  wherein the plurality of channel resources that can be used to send the HARQ-ACK information and the periodic CSI comprise two or more channel resources of different formats or two or more channel resources of a same format, wherein the two or more channel resources of the same format correspond to different second indication information.

10. The user terminal according to claim 7, wherein the processor being configured to determine, according to the first indication information, the piece quantity of periodic CSI that can be sent on the first channel resource comprises the processor being configured to:
  determine, according to the bit quantity information of the periodic CSI and a configured bit quantity and a configured priority of each piece of periodic CSI sent by the user terminal in a current subframe, the piece quantity of the periodic CSI that can be sent on the first channel resource.

11. The user terminal according to claim 7, wherein the processor being configured to determine, according to the first indication information, the bit quantity of periodic CSI that can be sent on the first channel resource comprises the processor being configured to:
  determine, according to the piece quantity information of the periodic CSI and a configured bit quantity and a configured priority of each piece of periodic CSI sent by the user terminal in a current subframe, the bit quantity of the periodic CSI that can be sent on the first channel resource.

12. The user terminal according to claim 7, wherein, when an encoding bit rate of the HARQ-ACK information is the same as an encoding bit rate of the periodic CSI, the processor being configured to determine, according to the first indication information, the bit quantity of periodic CSI that can be sent on the first channel resource or the piece quantity of periodic CSI that can be sent on the first channel resource, comprises the processor being configured to:
  determine, according to the encoding bit rate information of the HARQ-ACK information, the bit quantity of the periodic CSI that can be sent on the first channel resource; or determine, according to the encoding bit rate information of the HARQ-ACK information, the bit quantity of the periodic CSI that can be sent on the first channel resource, and determine the piece quantity of the periodic CSI according to the bit quantity of the periodic CSI that can be sent on the first channel resource and a configured bit quantity and a configured priority of each piece of periodic CSI sent by the user terminal in a current subframe, wherein the bit quantity of the periodic CSI that can be sent on the first channel resource is less than or equal to a difference between a maximum bit quantity of the UCI information that can be transmitted on the first channel resource and an original bit quantity of the HARQ-ACK information, and the maximum bit quantity of the UCI information that can be transmitted on the first channel resource corresponds to the encoding bit rate of the HARQ-ACK information and a total resource quantity of the first channel resource; or
  wherein, when the encoding bit rate of the HARQ-ACK information is different from the encoding bit rate of the periodic CSI, the processor being configured to determine, according to the first indication information, the bit quantity of periodic CSI that can be sent on the first channel resource or the piece quantity of periodic CSI that can be sent on the first channel resource comprises the processor being configured to:
  determine, according to the encoding bit rate information of the HARQ-ACK information, the bit quantity of the periodic CSI that can be sent on the first channel resource; or determine, according to the encoding bit rate information of the HARQ-ACK information, the bit quantity of the periodic CSI that can be sent on the first channel resource, and determine the piece quantity of the periodic CSI according to the bit quantity of the periodic CSI that can be sent on the first channel resource and a configured bit quantity and a configured priority of each piece of periodic CSI sent by the user terminal in a current subframe, wherein the bit quantity of the periodic CSI that can be sent on the first channel resource corresponds to the encoding bit rate of the periodic CSI and a quantity of resources that can be occupied by the periodic CSI, the encoding bit rate of the periodic CSI is equal to a sum of the encoding bit rate of the HARQ-ACK information and a difference between the encoding bit rate of the HARQ-ACK information and the encoding bit rate of the periodic CSI, the quantity of resources that can be occupied by the periodic CSI is less than or equal to a difference between a total resource quantity of the first channel resource and the quantity of resources occupied by the HARQ-ACK information, and the quantity of resources occupied by the HARQ-ACK information corresponds to the encoding bit rate of the HARQ-ACK information and an original bit quantity of the HARQ-ACK information.

13. The user terminal according to claim 7, wherein, when an encoding bit rate of the HARQ-ACK information is the same as an encoding bit rate of the periodic CSI, the processor being configured to determine, according to the first indication information, the bit quantity or the piece quantity of periodic CSI that can be sent on the first channel resource comprises the processor being configured to:
determine, according to the information about the quantity of resources that need to be occupied by the HARQ-ACK information, the bit quantity of the periodic CSI that can be sent on the first channel resource; or determine, according to the information about the quantity of resources that need to be occupied by the HARQ-ACK information, the bit quantity of the periodic CSI that can be sent on the first channel resource, and determine the piece quantity of the periodic CSI according to the bit quantity of the periodic CSI that can be sent on the first channel resource and a configured bit quantity and a configured priority of each piece of periodic CSI sent by the user terminal in a current subframe, wherein the bit quantity of the periodic CSI that can be sent on the first channel resource is less than or equal to a difference between a maximum bit quantity of the UCI information that can be transmitted on the first channel resource and an original bit quantity of the HARQ-ACK information, the maximum bit quantity of the UCI information that can be transmitted on the first channel resource corresponds to the encoding bit rate of the HARQ-ACK information and a total resource quantity of the first channel resource, and the encoding bit rate of the HARQ-ACK information corresponds to the quantity of resources that need to be occupied by the HARQ-ACK information and the original bit quantity of the HARQ-ACK information; or
wherein, when an encoding bit rate of the HARQ-ACK information is different from an encoding bit rate of the periodic CSI, the processor being configured to determine, according to the first indication information, the bit quantity or the piece quantity of periodic CSI that can be sent on the first channel resource comprises the processor being configured to: determine, according to the information about the quantity of resources that need to be occupied by the HARQ-ACK information, the bit quantity of the periodic CSI that can be sent on the first channel resource; or determine, according to the information about the quantity of resources that need to be occupied by the HARQ-ACK information, the bit quantity of the periodic CSI that can be sent on the first channel resource, and determine the piece quantity of the periodic CSI according to the bit quantity and a configured bit quantity and a configured priority of each piece of periodic CSI sent by the user terminal in a current subframe, wherein the bit quantity of the periodic CSI that can be sent on the first channel resource corresponds to a quantity of resources that can be occupied by the periodic CSI and the encoding bit rate of the CSI, and the quantity of resources that can be occupied by the periodic CSI is less than or equal to a difference between a total resource quantity of the first channel resource and the quantity of resources that need to be occupied by the HARQ-ACK information.

14. A network device, comprising:
a transmitter, configured to:
transmit downlink data to a user terminal using a first carrier of a plurality of downlink carriers, wherein the user terminal sends Hybrid Automatic-Repeat-Request acknowledgement (HARQ-ACK) information and periodic channel state information (CSI) using a first channel resource, and one of the plurality of downlink carriers corresponds to the HARQ-ACK information and the periodic CSI; and
send physical layer signaling to the user terminal, wherein the physical layer signaling comprises indication information;
a processor, configured to:
determine the indication information, wherein the indication information comprises one or a combination of: bit quantity information of the periodic CSI, piece quantity information of the periodic CSI, encoding bit rate information of the HARQ-ACK information, information about a quantity of resources that need to be occupied by the HARQ-ACK information, maximum bit quantity information of uplink control information (UCI) that can be transmitted on the first channel resource, or an identifier of the first channel resource; and
a receiver, configured to receive the periodic CSI and the HARQ-ACK information that are reported by the user terminal.

15. The network device according to claim 14, wherein the processor is configured to determine the bit quantity information of the periodic CSI; and
wherein a sum of a bit quantity corresponding to the bit quantity information of the periodic CSI and an original bit quantity of the HARQ-ACK information is less than or equal to a maximum bit quantity of the UCI information that can be transmitted on the first channel resource, and when an encoding bit rate of the HARQ-ACK information is the same as an encoding bit rate of the periodic CSI, the maximum bit quantity of the UCI information that can be transmitted on the first channel resource corresponds to a total quantity of the first channel resource, the encoding bit rate of the HARQ-ACK information, and the encoding bit rate of the periodic CSI; or a bit quantity corresponding to the bit quantity information of the periodic CSI corresponds to a quantity of resources that can be occupied by the periodic CSI and an encoding bit rate of the periodic CSI, and when an encoding bit rate of the HARQ-ACK information is different from the encoding bit rate of the periodic CSI, the quantity of resources that can be occupied by the periodic CSI is less than or equal to a difference between a total quantity of the first channel resource and the quantity of resources occupied by the HARQ-ACK information, and the quantity of resources occupied by the HARQ-ACK information corresponds to the encoding bit rate of the HARQ-ACK information and an original bit quantity of the HARQ-ACK information.

16. The network device according to claim 14, wherein the processor is configured to determine the piece quantity information of the periodic CSI;
wherein a piece quantity corresponding to the piece quantity information of the periodic CSI corresponds to a bit quantity and a priority of each piece of CSI sent by the user terminal in a current subframe and a bit quantity of the periodic CSI; and
wherein a sum of the bit quantity corresponding to the piece quantity of the periodic CSI and an original bit quantity of the HARQ-ACK information is less than or equal to a maximum bit quantity of the UCI information that can be transmitted on the first channel resource, and when an encoding bit rate of the HARQ-ACK information is the same as an encoding bit rate of the periodic CSI, the maximum bit quantity of the UCI information that can be transmitted on the first channel resource corresponds to a total quantity of the first channel resource, the encoding bit rate of the HARQ-ACK information, and the encoding bit rate of the periodic CSI; or the bit quantity corresponding to the piece quantity of the periodic CSI corresponds to a quantity of resources that can be occupied by the periodic CSI and an encoding bit rate of the periodic CSI, and when an encoding bit rate of the HARQ-ACK information is different from the encoding bit rate of the periodic CSI, the quantity of resources that can be occupied by the periodic CSI is less than or equal to a difference between a total quantity of the first channel resource and the quantity of resources occupied by the HARQ-ACK information, and the quantity of resources occupied by the HARQ-ACK information corresponds to the encoding bit rate of the HARQ-ACK information and an original bit quantity of the HARQ-ACK information.

17. The network device according to claim 14, wherein the processor is configured to determine the encoding bit rate information of the HARQ-ACK information; and
wherein an encoding bit rate corresponding to the encoding bit rate information of the HARQ-ACK information corresponds to a target received bit error rate of the HARQ-ACK information and a channel condition.

18. The network device according to claim 14, wherein the processor is configured to determine the information about the quantity of resources that need to be occupied by the HARQ-ACK information; and
wherein a resource quantity corresponding to the information about the quantity of resources that need to be occupied by the HARQ-ACK information is greater than or equal to a resource quantity obtained according to an original bit quantity of the HARQ-ACK information and an encoding bit rate of the HARQ-ACK information, and the encoding bit rate of the HARQ-ACK information corresponds to a target received bit error rate of the HARQ-ACK information and a channel condition.

19. The network device according to claim 14, wherein the processor is configured to determine the maximum bit quantity information of the UCI information that can be transmitted on the first channel resource; and
wherein, when an encoding bit rate of the HARQ-ACK information is the same as an encoding bit rate of the periodic CSI, a maximum bit quantity corresponding to the maximum bit quantity information of the UCI information that can be transmitted on the first channel resource is equal to a bit quantity obtained according to a total resource quantity of the first channel resource and the encoding bit rate of the HARQ-ACK information, and the encoding bit rate of the HARQ-ACK information corresponds to a target received bit error rate of the HARQ-ACK information and a channel condition; or when an encoding bit rate of the HARQ-ACK information is different from an encoding bit rate of the periodic CSI, a maximum bit quantity corresponding to the maximum bit quantity information of the UCI information that can be transmitted on the first channel resource is greater than or equal to a sum of a bit quantity of the HARQ-ACK information and a bit quantity of periodic CSI that can be sent on the first channel resource, the bit quantity of the periodic CSI that can be sent on the first channel resource corresponds to the encoding bit rate of the periodic CSI and a quantity of resources that can be occupied by the periodic CSI, there is a difference between the encoding bit rate of the periodic CSI and the encoding bit rate of the HARQ-ACK information, the quantity of resources that can be occupied by the periodic CSI is a resource quantity obtained by subtracting the quantity of resources occupied by the HARQ-ACK information from a total resource quantity of the first channel resource, the quantity of resources occupied by the HARQ-ACK information corresponds to the encoding bit rate of the HARQ-ACK information and the bit quantity of the HARQ-ACK information, and the encoding bit rate of the HARQ-ACK information corresponds to a target received bit error rate of the HARQ-ACK information and a channel condition.

20. The network device according to claim 14, wherein the processor is further configured to determine an encoding bit rate of the HARQ-ACK information according to a target received bit error rate of the HARQ-ACK information and a channel condition.

* * * * *